April 6, 1948.  J. E. SHAFER  2,439,269
BEARING MOUNTING
Filed Dec. 29, 1945
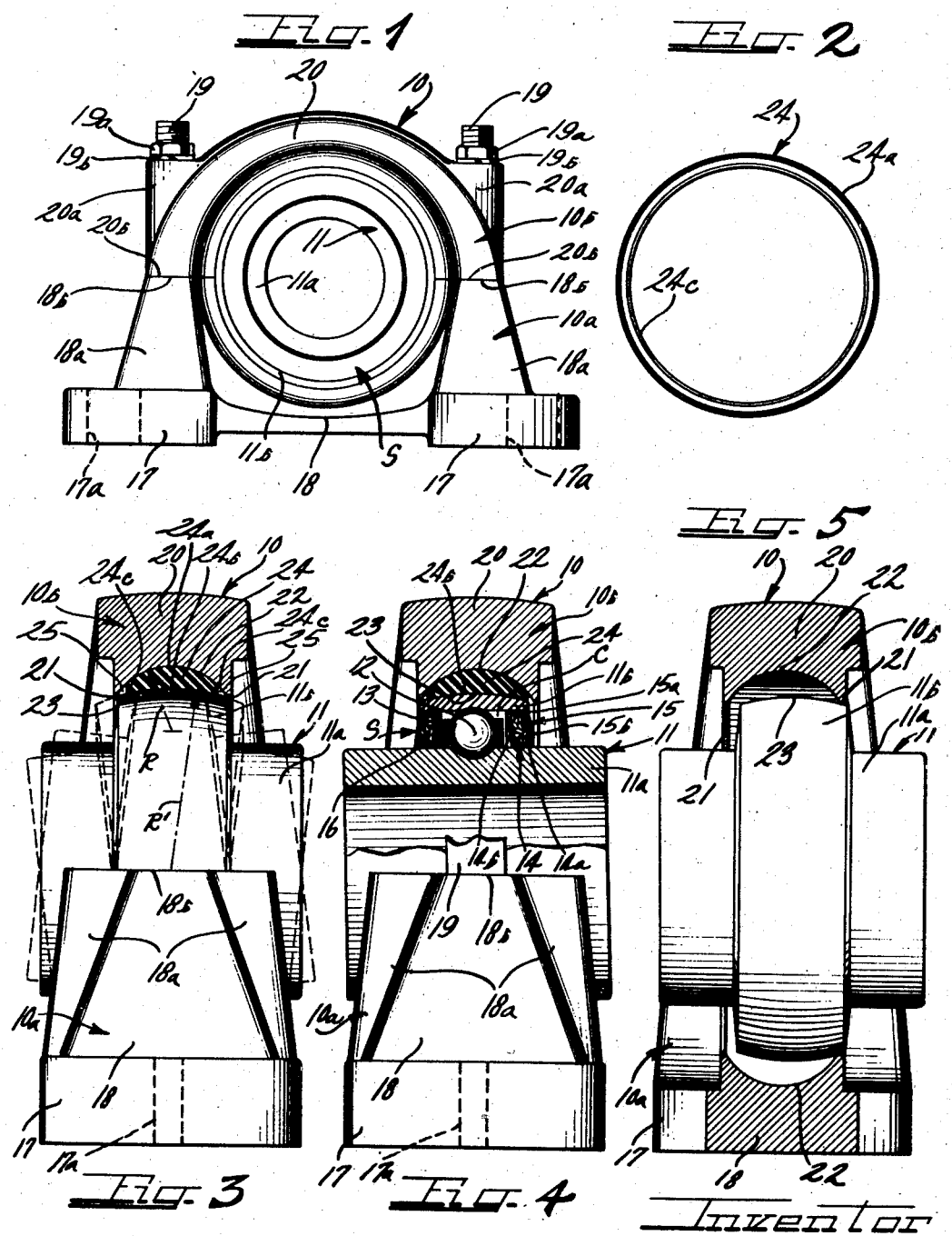
Inventor
JULIUS E. SHAFER
by The Firm of Charles W. Hills Attys.

Patented Apr. 6, 1948

2,439,269

UNITED STATES PATENT OFFICE 2,439,269

BEARING MOUNTING

Julius E. Shafer, Chicago, Ill.

Application December 29, 1945, Serial No. 638,119

6 Claims. (Cl. 308—184)

This invention relates to mountings for bearings and the like which permit adjustment of the bearings and hold the bearings in adjusted position.

Specifically, the invention deals with resilient mountings for industrial anti-friction bearing units which quiet the operation of the units, permit the units to be adjustably tilted when installed, and lock the units in adjusted positions.

The invention will hereinafter be specifically described as embodied in a pillow block-carried sealed ball bearing unit, but it should be understood that the invention is generally useful for mounting self-aligning members such as industrial bearing units.

According to this invention, a bushing ring of non-compressible resilient flowable material, such as rubber, is provided with a concave inside surface for snugly fitting on the convex outer surface of a bearing unit. The bushing ring also has a convex outer surface for snugly fitting on the concave inner wall of a pillow block or housing for the bearing. The bushing ring has flat side faces of substantial thickness which are adapted to be laterally deformed when the ring is loaded without effecting pinching of the rubber.

The inner concave surface of the bushing ring is struck from a radius centered on the center point of the bearing unit. The outer convex surface of the ring is struck from a much shorter radius centered in transverse alignment with the center point for the longer radius from which the inner surface is struck. As a result, the bushing ring has a crowned contour and increases in thickness inwardly from the flat side faces thereof.

The pillow block is of the split, or two-piece, type and has its inner concave face snugly fitting on the crowned or convex outer face of the bushing ring to extend beyond the flat sides of the ring to apertures in the side faces of the block. When the two pieces of the pillow block are drawn together, the bushing ring is loaded and deformed by interparticle flow of the rubber to assume a wider but thinner cross section. The side faces of the bushing ring are bulged laterally into a somewhat bowed form, but these bowed side faces are freely received into converging spaces between the bearing and pillow block so that they will not be pinched or cut off.

The feature of providing converging spaces for receiving the laterally deformed faces of the rubber ring equalizes loads applied to the rubber, and makes it possible to subject the rubber ring to very high loads without deforming the rubber beyond its elastic limits. Such preloading of the rubber will eliminate a mushy or soft mounting which would otherwise result with the use of soft deformable material such as rubber.

A feature of the invention resides in the provision of side walls on the pillow block that extend down to apertures, the diameters of which will not accommodate passage of the bearing completely therethrough, so that the convex outer wall of the bearing unit will strike against these side walls of the pillow block to be retained in the pillow block even though the rubber ring completely disintegrates. This feature provides an added safety factor for the assembly because the bearing unit cannot work out of the pillow block mounting.

The bearing unit can be tilted about its own center in the pillow block to the desired adjusted position therein, and is then firmly held in this position when the bushing ring is loaded by drawing the pillow block sections together.

The rubber ring will absorb vibration, and prevents metal-to-metal contact of the bearing and pillow block members. As a result, very quiet operation of the bearing is insured.

It is, then, an object of this invention to provide a resilient mounting for a self-aligning unit, which mounting is adapted to be highly loaded for locking the unit in adjusted position.

A further object of the invention is to provide a rubber mounting for self-aligning bearings which mounting will withstand heavy loads without deteriorating, will automatically center the bearing in its mounting, and will hold the bearing in adjusted position in its mounting.

Another object of the invention is to provide a pillow block-carried bearing assembly with a one-piece rubber bushing or mounting ring that absorbs vibration and locks the bearing in fixed position in the pillow block.

Another object of the invention is to provide a safety rubber mounting for bearings that will retain the bearing even though the rubber is completely deteriorated.

A specific object of the invention is to provide a bearing mounting embodying a split housing and a rubber bushing ring that is laterally deformed into converging spaces when the housing is tightened around the bushing.

Other and further objects of this invention will be apparent to those skilled in the art from the following detailed description of the annexed sheet of drawings which, by way of a preferred example only, illustrates one embodiment of the invention.

On the drawings:

Figure 1 is a front elevational view of a split pillow block and sealed bearing unit assembly according to this invention.

Figure 2 is an elevational view of a rubber bushing ring for mounting the bearing unit in the pillow block of Figure 1.

Figure 3 is a side elevational view, with parts cut away and shown in transverse cross section, of a pillow block and bearing assembly equipped with the rubber mounting ring of Figure 2 and illustrating the form of the ring before it is loaded to lock the bearing in adjusted position in the pillow block.

Figure 4 is a view similar to Figure 3 but illustrating the assembly in locked adjusted position.

Figure 5 is a transverse vertical cross-sectional view, with parts in side elevation, illustrating the assembly of Figure 1 without the rubber bushing, and showing how the pillow block retains the bearing even when the rubber bushing is removed.

As shown on the drawings:

In Figures 1, and 3 to 5, the reference numeral 10 designates generally a pillow block carrying a sealed industrial bearing unit 11.

The pillow block 10 is composed of a base part 10a and a top yoke part 10b.

The bearing unit 11 is composed of an inner race ring 11a with a groove around the periphery thereof providing an inner raceway, and an outer race ring 11b with a groove around the inner periphery thereof providing an inner raceway. As shown in Figure 4, a row of balls 12 rides in these inner and outer raceways to hold the rings 11a and 11b in radially spaced apart relatively rotatable but relatively axially fixed relation. A ball cage 13 holds the balls 12 in spaced relation around the periphery of the ring 11a.

Seals S are provided on opposite sides of the ball cage 13 to provide a sealed chamber C between the rings 11a and 11b. Each seal S includes an inner flinger 14 on the inner race ring 11a, and an outer retainer 15 in the outer race ring 11b together with a felt sealing ring 16 between the flinger 14 and retainer 15. The flinger 14 has an axially outturned flat base portion 14a pressed onto the inner race ring 11a to fix the flinger to the ring. This base extends axially inward to an integral flange 14b which slopes radially outward and axially inward into spaced relation from the outer ring 11b. The retainer 15 includes a peripheral rim or flat base 15a which is pressed into the outer race ring 11b to be fixed relative to the ring and extends outwardly from an inner edge to a flange 15b. This flange 15b slopes radially inward and axially outward to overlie the outer edge of the base 14a of the flinger 14 in closely spaced relation therefrom. The flange 14b of the flinger 14, in turn, extends into closely spaced relation from the inner edge of the base or rim 15a on the retainer 15.

The seal members 14 and 15 thus have bases 14a and 15a in radially spaced apart parallel relation, together with flanges 14b and 15b in axially spaced apart parallel sloping relation. A chamber is thereby provided between the two rings. These two rings are preferably composed of metal or other rigid material. The felt sealing ring 16 is disposed in the space between the rings and is preferably bonded to the flinger 14 for being held thereby in close running clearance relation to the retainer 15.

The flanges 14b and 15b preferably slope at an angle of about 15° from a plane normal to the concentric axes of the rings 11a and 11b.

Since the inner race ring 11a is the rotating member of the bearing 11, the seals S act very efficiently to retain grease in the ball chamber C and to exclude dirt from this ball chamber without, however, imparting frictional resistance to relative rotation of the inner and outer race rings. Thus grease, in order to work out of the ball chamber C, must pass through the very small gap between the outer edge of the flange 14b and the base 15a. Such passage is resisted by centrifugal force which tends to fling the grease back through the gap into the ball chamber due to the inward slope of the flange 14b. If, however, the grease does work into the chamber between the metal rings of the seal, the felt sealing ring will resist outward passage of the grease and impregnation of the felt ring with grease is desirable to lubricate the adjacent surfaces of the rotating felt and stationary retainer 15.

Dirt on the outside of the bearing is sealed from the ball chamber C since passage of dirt into the chamber C must occur through the seals S, and is resisted by the labyrinth passage as well as by centrifugal action. Thus, in order for dirt to enter the chamber C, it must first pass through the gap between the base 14a and the inner edge of the flange 15b but centrifugal force of the rotating base 15a will throw this dirt away from the gap. If dirt does pass through the gap, further passage is resisted by the sealing ring 16.

The base part 10a of the pillow block 10 has feet 17, 17 on the bottom thereof each provided with an aperture 17a for receiving a mounting stud to secure the base on a support (not shown) such as a machine frame, a floor, a wall, or the like. A main body part 18 is integral with the feet 17 and includes upstanding opposed side flanges 18a above each foot. The main body 18 extends to flat tops 18b on opposite sides of a central semi-cylindrical pocket or recess. Studs 19 (Figures 1 and 4) extend upwardly from the flat top faces 18b of the base 10a and have threaded upper ends. These studs are secured in the base 10a.

The top yoke part 10b is composed of a semi-cylindrical main body 20 with hollow bosses 20a on opposite sides thereof receiving the studs 19 therethrough. The main body 20 terminates in flat bottom faces 20b for seating on the top faces 18b of the base part 10a.

Nuts 19a threaded on the studs 19 act on washers 19b on top of the hollow bosses 20a to secure the yoke part to the base part with the faces 20b and 18b thereof in thrusting relation.

The inner faces of the bodies 18 and 20 cooperate to provide a central aperture through the pillow block with circular end openings 21. The bodies 18 and 20 have concave pockets between the end openings 21 provided by transversely arcuate inner walls 22 struck from a relatively short radius so that the pockets are quite deep.

As shown in Figure 3, the wall 22 is struck from a very short radius R centered outside of the inner race ring 11a of the bearing but lying in a transverse plane through the center point of the bearing 11.

The outer race ring 11b of the bearing has a convex transversely arcuate outer wall 23 that is much flatter than the wall 22 and, as shown in Figure 3, is struck from a relatively long radius R' centered on the center point of the race ring 11b. The major diameter of the outer race ring 11b provided by the convex wall 23 is greater than the diameter of the apertures 21 in the side faces of the pillow block so that, as shown in Figure 5, the bearing 11 cannot be passed through the apertures 21 when the base and yoke parts of the pillow block are secured together in operative relation. However, as shown in Figure 4, the outer race ring 11b fits freely in the pocket provided by the concave wall 22 of the pillow block parts in spaced relation from the pillow block.

In accordance with this invention, a bushing ring 24 (Figure 2) composed of non-compressible flowable resilient material, such as rubber, is provided to mount the bearing 11 in the pillow block 10. This ring 24 has a convex transversely arcuate outer wall 24a struck from the same radius R as the wall 22 of the pillow block for full seating engagement on the wall 22. The ring 24 has a concave transversely arcuate inner wall 24b, best shown in Figures 3 and 4, struck from the same radius R' as the wall 23 of the outer race ring 11b. The ring 24 is adapted to be stretched over the outer race ring 11b into full seating engagement on the central portion thereof to provide a rubber band around the bearing. The ring 24 has flat side faces 24c of appreciable thickness in their unloaded condition, as shown in Figure 3.

The ring 24, as shown in Figure 3, is of less width than the outer race ring 11b on which it is seated, and is positioned on the central portion of the outer race ring. The ring 24 is of less width than the wall 22 of the pillow block and, in its free state, is seated in the central portion of the recess provided by this wall. Spaces 25 are thereby provided between the flat end faces 24c of the ring and the apertures 21 of the pillow block.

In its free state the ring 24 has the crowned outer wall 24a thereof of slightly greater diameter than the pocket provided by the wall 22 of the pillow block parts when these parts are drawn together in abutting relation as shown in Figure 1, but the outer wall 24a nevertheless has full seating conformity with the wall 22 of the pillow block. The outside diameter of the ring 24 in its free state on the bearing race ring 11b need only be slightly greater than the diameter of the wall 22 of the pillow block parts when these parts are together in order for the ring 24 to lock the bearing in adjusted position in the pillow block in accordance with this invention. For example, the ring 24 need only have a diameter of from .010 to .025 inch greater than the diameter of the wall 22, dependent upon the durometer hardness of the rubber, with the larger diameters being used for the softer rubbers.

To assemble the bearing in the pillow block, in accordance with this invention, the ring 24 is seated on the outer race ring 11b of the bearing, the yoke part 10b of the pillow block is removed from the base part 10a, the bearing with the ring therearound is seated in the pocket provided by the wall 22 of the base part, the yoke 10a is then seated over the top half of the bearing and rubber ring 24 to receive the studs 19 through the bosses 20a thereof, and the nuts 19a are tightened to draw the faces 20b of the yoke part against the faces 18b of the base part. The rubber ring 24 is thus loaded to bow out the flat side faces 24c thereof into the spaces 25 as shown in Figure 4. The outward bowing of the side faces, however, is not sufficient to flow rubber into the apertures 21 of the pillow block and the rubber, therefore, cannot be pinched between the pillow block and outer race ring of the bearing.

As illustrated in Figure 3 in solid and dotted lines, the bearing 11 is tilted in the pillow block 10 before the nuts 19a are tightened so as to have its desired adjusted position in the pillow block. Then when the nuts 19a are tightened, the bearing is locked in this adjusted position as shown in Figure 4 and its outer race ring 11b cannot rotate or tilt in the pillow block although interparticle flow of the rubber will absorb and dampen vibration to produce a very quiet-running bearing assembly. Tilting movements of the bearing 11 in the pillow block, before the nuts 19a are tightened, are held about the exact center point of the bearing by the preformed mating walls of the rubber bushing, the outer race ring, and the pillow block, so that tilting adjustment prior to locking the bearing in adjusted position is about the center point of the bearing.

The loading of the bushing to reduce its major diameter to the same diameter of the pillow block brings about a lateral spreading of the rubber, but this spreading action is well within the elastic limits of the rubber material and the bushing in operation, is always maintained under compression loads. The expansion spaces 25 converge toward the apertures 21 so that further lateral spreading of the rubber is resisted and tremendous forces would be required to extrude the rubber through the apertures 21.

A safety factor of this invention resides in the provision of apertures 21 which are smaller than the crown diameter of the outer race ring 11b so that the bearing cannot work out of the pillow block even though the rubber were to be completely disintegrated. Disintegration of the rubber and removal of the rubber from the pocket provided by the walls 22 of the pillow block, nevertheless, is practically impossible due to the arrangement of the converging spaces 25.

If desired, the rubber ring 24 may be cemented to the wall 22, or the wall 22 can be an untreated metal surface that will eventually be wrung to or bonded with the rubber during operation of the bearing. The wall 23 of the outer race ring 11b is preferably finished with a case hardened or blued surface which will not bond to the rubber so that the bearing can be readjusted in the bushing ring even after prolonged usage.

As illustrated in Figures 3 and 4, the rubber in its free condition is thicker at its axial center than at the ends thereof and increases gradually in thickness from the ends 24c due to the long and short radii from which the inner and outer surfaces thereof are struck. When the rubber is loaded, the thickness of the ring is somewhat decreased, but as shown in Figure 4, the loaded ring still retains its major thickness at its axial central portion.

Provision of the converging spaces 25 as the only areas into which the rubber can flow when loaded makes possible the maintenance of a very high form factor for the rubber and prevents the rubber in operation from passing from a compressive load through its neutral unloaded condition to a tension load. Increased wear life is thus insured.

From the above descriptions it will be clear that this invention provides a resilient mounting for bearings which will retain bearings in their housings in locked adjusted positions and will provide for quiet operation of the bearings.

This application is a continuation-in-part of my copending application, Serial No. 579,349, filed February 23, 1945.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A tiltable bearing mounting for resiliently carrying a bearing unit in locked position while providing for quiet operation of the bearing which comprises a housing having opposed apertured end faces and a concave transversely arcuate wall providing a relatively deep pocket between the apertured end faces, a bearing unit having an outer race ring with a convex transversely arcuate outer wall of flatter contour than said pocket, the major diameter of said outer wall of the bearing being greater than the diameter of the apertures in the end faces of the housing but materially less than the diameter of the housing wall between said apertures, a bushing ring of non-compressible resilient flowable material disposed between said concave wall of the housing and said convex wall of the bearing in full seating conformity therewith, said bushing ring in its unloaded condition having relatively thick end faces inwardly of said apertures in the housing, said concave wall of the housing and said convex wall of the bearing converging toward said apertures of the housing to provide spaces adjacent said thick end faces of the bushing ring, and means on said housing for compressively loading said bushing ring to laterally expand the ring by bowing said thick end faces of the bushing ring into said spaces to thereby lock the bearing in adjusted position in the housing.

2. A self-aligning resilient mounting for a bearing having a convex transversely arcuate outer wall struck from a radius centered on the center point of the bearing which comprises a housing having circularly apertured spaced opposed end faces, the diameters of said apertures being greater than the minor diameter of the convex wall of the bearing but being smaller than the major diameter of said convex wall, said housing having a concave transversely arcuate wall between said apertured end faces struck from a relatively short radius to provide a deep pocket, a rubber bushing ring interposed between the concave wall of the housing and the convex wall of the bearing and having inner and outer surfaces conforming with the contour of said walls, said bushing ring in its free state being narrower than said concave wall of the housing and said convex wall of the bearing and seated on the central portions of said walls, said bushing ring in its free state having relatively thick end faces spaced inwardly from the apertures in said end faces of the housing, and means for contracting the housing around the bushing ring to load the bushing and deform the end faces thereof laterally outward into converging spaces provided between the convex outer wall of the bearing and the concave inner wall of the housing.

3. A bearing mounting for a bearing unit having a convex outer bearing wall and a split pillow block having a concave inner bearing wall converging toward the outer sides of the convex wall of the bearing to provide a space between the bearing and housing that is thickest at the midportion thereof and thins down toward the sides thereof, a one-piece rubber ring in said space terminating inwardly from the sides of the space, said rubber ring in its free state having a diameter slightly greater than the diameter of the concave wall of the housing, and means for contracting said housing to radially load said rubber ring for locking the bearing in adjusted position in the housing.

4. A bearing assembly including a bearing with a convex outer surface, a housing having apertured end faces with a concave inner surface therebetween, said concave surface converging toward said convex surface to provide narrow converging gaps therebetween inwardly of the apertured end faces of the housing, a resilient bushing seated on the central portions of said surfaces, and means for radially loading the bushing while allowing it to spread laterally only into the converging gaps inwardly of the apertures for locking the bearing in the housing.

5. In a pillow block and bearing assembly, the improvements of a rubber bushing between the pillow block and bearing having blunt end faces inwardly of the side faces of the pillow block and bearing, and means for loading the bushing to bow said end faces laterally into the confined spaces between the pillow block and bearing for locking the bearing in the pillow block.

6. A bearing assembly comprising a bearing having a convex outer surface, a housing having apertured end faces with a concave inner surface therebetween, said concave surface converging toward said convex surface to provide narrow converging gaps therebetween inwardly of the apertured end faces of the housing, and a resilient bushing between the convex outer surface of the bearing and the concave inner surface of the housing and having relatively blunt end faces inwardly of the apertured end faces of the housing and adapted to be deformed into said converging gaps without shearing of the resilient material.

JULIUS E. SHAFER.

REFERENCES CITED

The following references are of record in the file of this patent:

UNITED STATES PATENTS

| Number | Name | Date |
|---|---|---|
| 1,732,657 | Picquerez | Oct. 22, 1929 |
| 2,138,659 | Kindig | Nov. 29, 1938 |